US005228234A

United States Patent [19]

de Klerk et al.

[11] Patent Number: 5,228,234

[45] Date of Patent: Jul. 20, 1993

[54] METHOD AND APPARATUS FOR MANUFACTURING SLEEVE- OR BAG-LIKE CONTAINERS, AS WELL AS SUCH CONTAINER

[75] Inventors: Johannes M. de Klerk, Noordwijkerhout; Johannes F. C. Duivenvoorden, De Zilk, both of Netherlands

[73] Assignee: Klerk's Plastic Industrie, B.V., Netherlands

[21] Appl. No.: 691,036

[22] PCT Filed: Nov. 15, 1989

[86] PCT No.: PCT/NL89/00082

§ 371 Date: Jul. 21, 1991

§ 102(e) Date: Jul. 21, 1991

[87] PCT Pub. No.: WO90/05630

PCT Pub. Date: May 31, 1990

[30] Foreign Application Priority Data

Nov. 15, 1988 [NL] Netherlands ........................ 8802814

[51] Int. Cl.[5] ............................................ A01G 5/00

[52] U.S. Cl. .................................... 47/41.01; 383/35; 206/423

[58] Field of Search ................................ 47/41.01, 72; 229/87.05; 206/423; 383/35, 37

[56] References Cited

U.S. PATENT DOCUMENTS

| | | | |
|---|---|---|---|
| 3,376,666 | 4/1968 | Leonard | 47/41.01 |
| 3,556,389 | 4/1971 | Gregoire | 47/72 |
| 3,979,050 | 9/1976 | Cilia | 383/35 |
| 4,091,925 | 5/1978 | Griffo | 47/41.01 |
| 4,854,451 | 8/1969 | Jensen | 383/37 |
| 5,041,317 | 8/1991 | Greyvenstein | 383/37 |

FOREIGN PATENT DOCUMENTS

| | | | |
|---|---|---|---|
| 1166692 | 3/1964 | Fed. Rep. of Germany | 206/423 |
| 2036163 | 12/1970 | France | 206/423 |
| 2074542 | 11/1981 | United Kingdom | 206/423 |

*Primary Examiner*—Henry E. Raduazo
*Attorney, Agent, or Firm*—St. Onge Steward Johnston & Reens

[57] ABSTRACT

A container for bunches of flowers comprising upper and lower parts connected to each other at their edges. Both container parts taper from a wide corrugated opening edge to a narrow end. The lower or first container part protrudes beyond the upper container part and is connected to an extension by tear portions.

1 Claim, 2 Drawing Sheets

METHOD AND APPARATUS FOR MANUFACTURING SLEEVE- OR BAG-LIKE CONTAINERS, AS WELL AS SUCH CONTAINER

The invention relates to a method of manufacturing sleeve- or bag-like containers, wherein two superimposed bands of material lying one above the other are cut transversely into separate container parts which are connected to each other at the cut edges as formed.

In a known method of this type which is used for manufacturing sleeve-like- containers for flower bunches known as flower sleeves, the bands of material are arranged with respect to each other in transverse direction such that one container part protrudes beyond the other container part on the opening side. The protruding portion or the extension of the one container part is thereafter perforated along a line thereby creating a tear line defining the opening edge of the respective container part. A plurality of containers is then connected at the extensions thereof. When the containers are to be provided around the bunches of cut flowers, a stack of containers is clamped at the extensions and the containers are teared off one-by-one along the tear line.

When it is desired to have containers of which the opening edges are machined, for instance cut as an ornamental edge, a stack of containers connected at the extensions is cut off below the tear line in a separate apparatus. Then there is provided a stack of loose containers difficult to handle when the containers are arranged around the bunches of cut flowers.

It is an object of the invention to provide a method of the type mentioned in the preamble, with which all kinds of sleeve- or bag-like containers having edges shaped in any form can be manufactured automatically.

For this purpose the method according to the invention is characterized in that the bands of material, prior to cutting them into separate containers, are separated on at least one longitudinal edge, whereafter at least one of these longitudinal edges of the bands of material is machined.

Due to these features the respective longitudinal edges of both bands of material may undergo different machining operations and it is for instance possible to manufacture in a simple way containers of which the opening edges of both container parts differ in shape or position due to the machining operation.

It is suitable for seperating the bands of material to guide them at least at the respective longitudinal edge thereof on either side of a flat seperating body.

As a result thereof there is effected a seperation of the bands of material at the respective longitudinal edge in a very simple way.

In an embodiment of the method wherein the bands of material are supplied simultaneously and stepwise, it is favourable according to the invention if the longitudinal edge of the bands of material are machined by die-cutting, preferably by means of heat.

The use of the heat is prefered in the case of materials that are difficult to cut, such as some types of plastic foils.

According to a further development of the method according the invention it is possible to machine the separated longitudinal edges of both bands of material into opening edges of the containers, wherein it is advantageously that the longitudinal edge of one band of material is cut off completely up to the opening edge of the respective container part, while the longitudinal edge of the other band of material remains connected to the opening edge of the other container part by a formed tear line.

Due to this measures it is for instance possible to manufacture containers that can be used as flower sleeves, wherein the opening edges of the container parts are defined by ornamental lines, while it is still permitted to provide one of the container parts with an extension connected by tear portion.

The invention also includes an apparatus for manufacturing sleeve- or bag-like containers using the method described hereinbefore, comprising means for supplying two superimposed bands of material, and cutting and connecting means extending across the bands of material for separating container parts from the bands of material and connecting them into a container.

According to the invention this apparatus is characterized by a separating body for separating the bands of material at least at one longitudinal edge and at least a machining device on one side of the separating body for machining the longitudinal edge of the respective band of material.

With this apparatus it is possible to machine a longitudinal edge of one band of material independent of the longitudinal edge of the other band of material.

By means of the method and apparatus discribed hereinbefore it is possible to manufacture a sleeve- or bag-like container assembled of sheet-like container parts connected on at least two edges and each having a opening edge machined substantially its whole length, the container being characterized in that the machined opening edges are formed differently.

A favourable embodiment of such a container has the characteristic that the central area of the opening edge of one container part protrudes beyond the opening edge of the other container part, while, preferably, the container part having the protruding opening edge is connected at this opening edge to an extension by means of tear portions.

On the one hand, it is possible to provide such a container with an attractive appearance due to the machined opening edges, while on the other hand the extension of the one container part connected by tear portions and the shorter length up to the opening edge of the other container portion effect a very easy handling of the container when it is to be arranged around the product to be packed. Then it is possible to clamp the containers at their extension as a bundle, as is know per se, and to easily grip the free hanging opening edge by hand since the respective container part is shorter.

The invention will hereafter be elucidated with reference to the drawing showing an embodiment of the invention by way of example.

Figure 2:
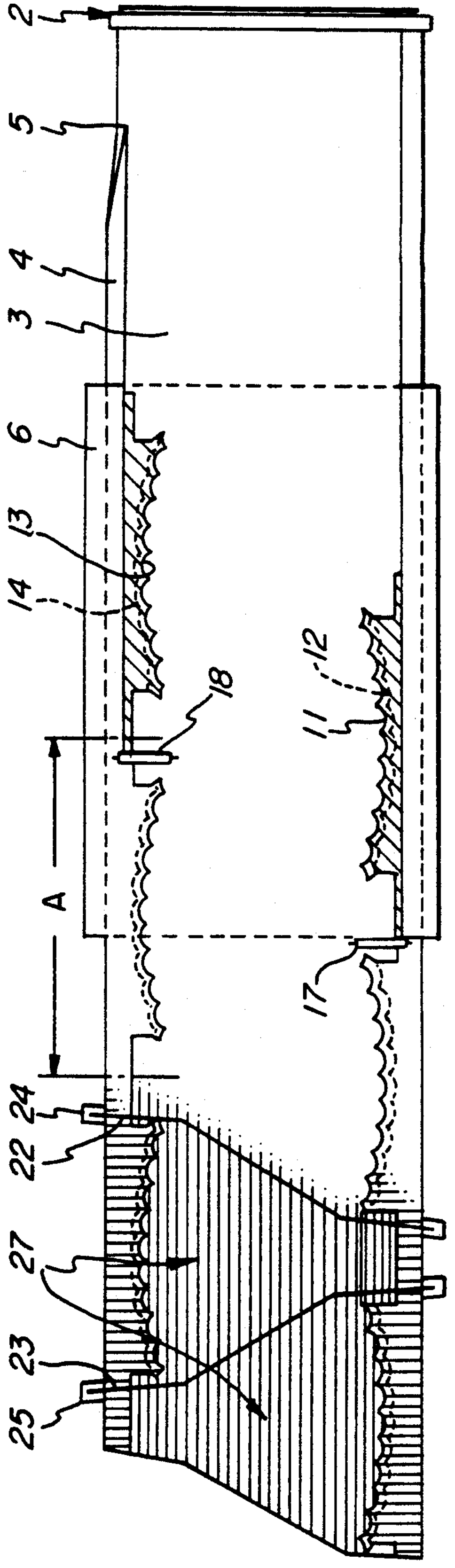
FIG. 2 is a very schematic plan view of the apparatus of FIG. 1, wherein several parts of FIG. 1 are omitted for the sake of clarity.

The drawing shows an embodiment of an apparatus for manufacturing sleeve- or bag-like containers, in particular flower sleeves for packing bunches of cut flowers, by way of example.

The apparatus comprises a frame 1 that is shown only very schematically and partially, and means for supplying two superimposed bands of material 3 and 4 from one or more rollers not shown, said means being supported by the frame 1 and being indicated only by a roller 2. In the embodiment illustrated by way of example, the bands of material 3 and 4 consist of the longitudinal parts of a single band of material folded double about a longitudinal axis, said longitudinal parts of the wider band of material being cut loose from each other by a knife 5. Of course, it is also possible to supply two separate bands of material 3 and 4, and in the case of bag-like containers the longitudinal parts of the double-folded wider band of material may remain connected to each other along the folding line.

The embodiment of the double-folded and cut-open single wide band of material has the advantage that the resulting bands of material always remain in a proper interrelationship in longitudinal direction and cannot drift with respect to each other, without requiring additional measures. This is particularly favourable with printed bands of material, wherein the printings of both bands of material 3 and 4 should have a fixed interrelationship.

In the embodiment shown by way of example, the single wide band of material is folded and cut-open by the knife 5 in such a way that the resulting lower band of material 4 is slightly wider than the upper band of material 3 and both of its longitudinal edges project a substantially equal distance outside the upper band of material 3. Of course, the bands of material 3 and 4 may also have equal widths. Drive means not shown effect a step-wise equal supply of both bands of material 3 and 4.

The frame 1 of the apparatus supports a horizontal separating plate 6 on its longitudinal sides protruding outside of the bands of material 3 and 4. This separating plate 6 serves for temporary separating both bands of material 3 and 4, for which purpose the upper band of material 3 is guided over the separating plate 6, while the lower band of material 4 is passed under the separating plate 6. After having passed the separating plate 6, both bands of material 3 and 4 merge again.

At both opposite longitudinal edges of the bands of material 3 and 4 there is arranged a cutting device 7 and 9, and 8 and 10, respectively above and below the separating plate 6. The cutting devices 7–10 are each provided with an electrically heated cutting die 11, 12, 13 and 14, respectively adapted to move up and down by means of a hydraulic or pneumatic cylinder 15 fixed to the frame 1 in order to press the cutting die against the separating plate 6 for performing the cutting operation.

The cutting dies 11 and 13 of the cutting devices 7 and 9 arranged above the separating plate 6 have a curved corrugated central area and two adjoining straight end areas extending more outwardly. These cutting dies 11 and 13 are arranged to effect an uninterrupted cut. The cutting dies 12 and 14 of the lower cutting devices 8 and 10 only have the curved corrugated central area, while the cutting face of these cutting dies is provided with notches 16 interrupting the cut caused by these cutting dies 12 and 14.

Furthermore, the cutting die 12, 14 of the lower cutting devices 8, 10 are off-set a small distance transverse to the bands of material 3 and 4 with respect to the cutting die 11, 14 of the respective upper cutting devices 7, 9 that are arranged symmetrically in longitudinal direction of the bands of material 3 and 4. The cutting devices 7 and 8, however, are off-set a distance forwardly in the direction of supply with respect to the cutting devices 9 and 10 at the opposite longitudinal edge of the bands of material 3 and 4.

In the neighbourhood of the rear end area of the cutting dies 11 and 13 of the upper cutting devices 7 and 9 there is journalled a transverse guide roller 17, 18, respectively adjacent the separating plate 6, and above each guide roller 17, 18 there is suspended a winding device 19, 20 for winding the continuous edge strips of the upper band of material 3 cut off by the respective cutting dies 11 and 13.

Alternatively, it is possible to construct the cutting dies 11, 13 such amongst others shorter without the straight end portions—that no continuous edge strip is cut off at the longitudinal edges of the upper band of material 3, but loose pieces are cut out. These loose pieces may be discharged by means of gripping means such as clips gripping the pieces before or after cutting, whereafter the clips are brought above collecting or discharging means by displacement means where the clips are being opened so that the pieces of material are released and fall down. It is also possible to exhaust the pieces.

At a distance behind the separating plate 6, as seen in the direction of supply of the bands of material 3 and 4, is a die-cutting and sealing device 21 cutting the separate container parts from the bands of material 3 and 4 and simultaneously connecting the facing container parts together at their cut edges by means of sealing. The die-cutting and sealing device 21 consists of two die-cutting and sealing means 22 and 23 extending across the bands of material 3 and 4 and above them and being arranged at a distance from each other, and of co-operating beams 24 and 25 lying under the bands of material. The die-cutting and sealing means 22 and 23 are adapted to move up and down and to be pressed against the respective beam 24, 25 by means of hydraulic or pneumatic cylinders 26 attached to the frame. Both die-cutting and sealing means 22 and 23 are arranged and formed symmetrically to an intermediate transverse plane, and each die-cutting and sealing means 22, 23 itself is constructed symmetrically with respect to its center.

The method to be carried out with the apparatus as discribed and shown is as follows.

A wide double-folded band of material is stepwise supplied step-wise via the roller 2 and is cut into a lower band of material 4 and a slightly narrower upper band of material 3 by means of the knife. Subsequently, the lower band of material 4 and the upper band of material 3 are passed under and over the separating plate 6, respectively. In a stand-still period of the bands of material 3 and 4 the cutting-dies 11–14 of all cutting devices 7–10 are moved and pressed against the respective side of the separating plate 6 by means of the respective cylinder 15. When using a plastic foil as container material the cutting dies 11–14 will preferably be heated electrically, so that a cut in the bands of material is formed in a very reliable manner. The upper cutting dies 11 and 13 completely cut off an edge strip indicated by a slanting hatching, while the lower cutting dies 12 and 14 only provide an interrupted cut without cutting-off the adjacent edge strip. In this way the opening edges of two oppositely directed containers are cut.

After die-cutting the bands of material 3 and 4 are conveyed a distance A further, whereafter the die-cutting operation is repeated. Said distance A is slightly less than the length of the cutting dies 11 and 13 of the upper cutting devices 7 and 9 so that adjacent cuts made by these cutting dies 11 and 13 are slightly overlapping and therefore effect a continuous cut-off edge strip on both longitudinal edges of the upper band of material 3. These edge strips may be passed around the respective guide rollers 17, 18 upwardly to the winding devices 19 and 20 where the edge strips are wound into a coil.

Figure 1:
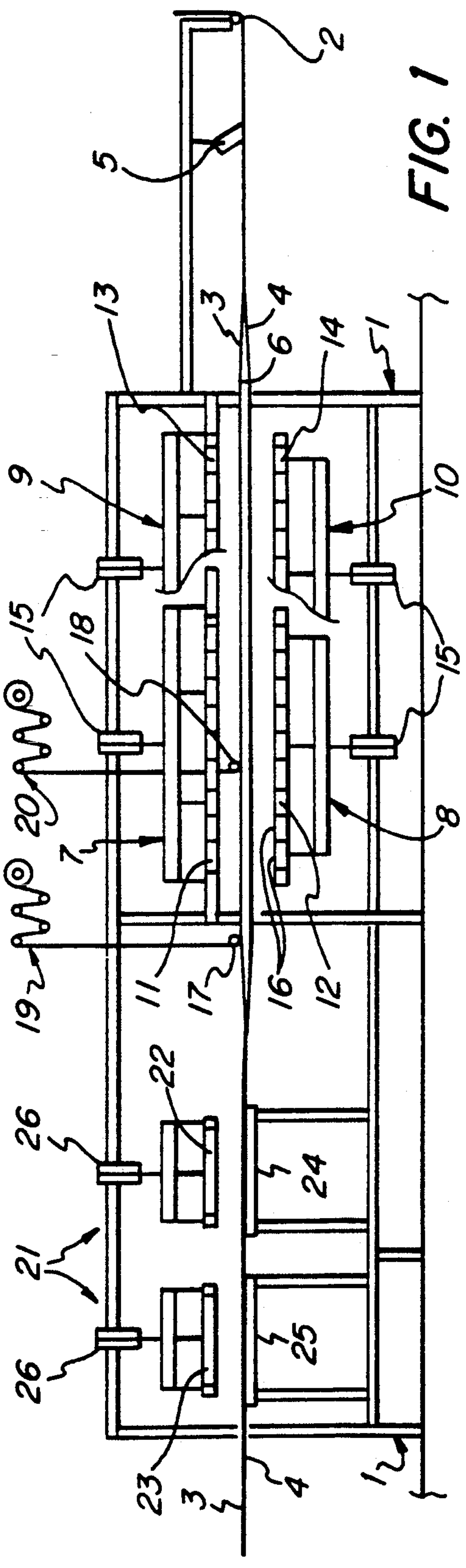
FIG. 1 is a very schematic side view of a portion of an apparatus for manufacturing sleeve- or bag-like containers.

In the die cutting and sealing device 21 the bands of material 3 and 4 machined at their longitudinal edges are cut across into separate container parts, while the respective container parts are directly connected at their cut edges by sealing. In FIG. 1, on the left side, the finally cut upper band of material 3 is indicated by horizontal hatching, while the vertical hatching illustrates the outwardly projecting portions of the lower band of material 4.

In this way, each cutting and sealing operation produces two separate oppositely directed containers 27 which are gathered and discharged in a known manner not shown.

It would also be possible according to the invention to omit the cutting dies 12 and 14 of the apparatus and to machine only the band of material 3 by means of the cutting dies 11 and/or 13 whereafter a stack of containers 27 is formed in or after the die-cutting and sealing device 21 and the tear line 31 is formed and all containers 27 simultaneously in a separate or a joining device. The apparatus according to the invention is then only used to make a cut into one of the bands of material lying inward of the lateral borders of the other band of material.

Figure 3:
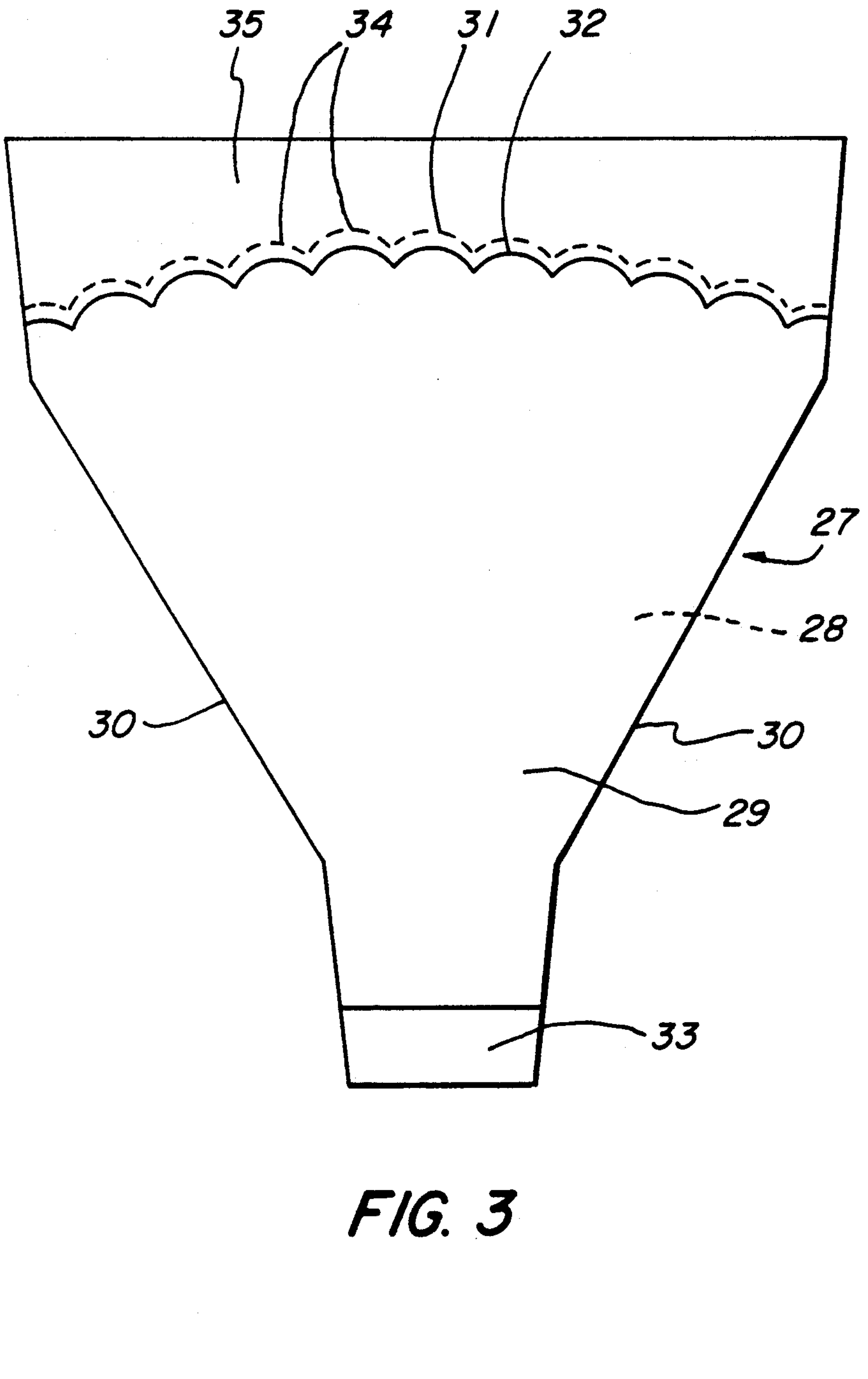
FIG. 3 is a plan view of a container according to the invention, on an enlarged scale.

FIG. 3 shows on a larger scale the container 27 obtained by the method discribed, in this example the container is a so-called flower sleeve 4 packing a bunch of cut flowers.

The container 27 as shown consists of a first lower container part 28 and a second upper container part 29, this container parts being connected to each other at their edges 30, for instance by sealing in the case of a plastic container. Both container parts 28 and 29 taper from a wide corrugated opening edge 31, 32 respectively to a narrow end 33. The container parts are not connected to each other at the narrow end 33.

The first container part 28 protrudes with its opening edge 31 beyond the opening edge 32 of the second container part 29, for instance a few millimeters. Furthermore the opening edge 31 of the first container part 28 is connected by tear portions 34 to an extension 35 serving for connecting and suspending a plurality of containers. When the container 27 is provided around the product, such as a bunch of flowers, the container 27 is teared loose from the extension 35 thereby producing the final usefull configuration of the container.

The invention is not restricted to the embodiment discribed hereinbefore and shown in the drawing by way of example, which can be varied in different manners within the scope of the invention. It is for instance possible to use the disclosed method and apparatus of manufacture pot-plant sleeves or bags.

We claim:

1. A sleeve-like container (27), manufactured of first and second sheet-like container parts (28, 29) connected at least at two edges (30) and each having wide opening edges (31, 32) of which a first opening edge (31) protrudes beyond a second opening edge (32) at least in a central area thereof, said first and second opening edges (31, 32) having a non-linear shape substantially the whole length thereof, said first container part (28) having said protruding first opening edge (31) being connected at substantially this whole opening edge (31) to an extension (35) by means of tear portions (34) forming a tear line extending at a distance from said second opening edge (32).

* * * * *